United States Patent
Ito et al.

(10) Patent No.: US 8,651,465 B2
(45) Date of Patent: Feb. 18, 2014

(54) METHOD OF MANUFACTURING BUSHING ASSEMBLY AND VIBRATION DAMPING RUBBER BUSHING

(75) Inventors: Tatsuya Ito, Komaki (JP); Noboru Arakawa, Nagoya (JP)

(73) Assignee: Tokai Rubber Industries, Ltd., Komaki-Shi (JP)

( * ) Notice: Subject to any disclaimer, the term of this patent is extended or adjusted under 35 U.S.C. 154(b) by 251 days.

(21) Appl. No.: 12/996,472

(22) PCT Filed: Jan. 29, 2010

(86) PCT No.: PCT/JP2010/000536
§ 371 (c)(1),
(2), (4) Date: Dec. 6, 2010

(87) PCT Pub. No.: WO2010/087194
PCT Pub. Date: Aug. 5, 2010

(65) Prior Publication Data
US 2011/0109027 A1 May 12, 2011

(30) Foreign Application Priority Data
Jan. 29, 2009 (JP) .................... 2009-018812

(51) Int. Cl.
*F16F 1/38* (2006.01)
(52) U.S. Cl.
USPC ............... 267/140.13; 267/293; 267/141.2
(58) Field of Classification Search
USPC ............ 267/292, 140.11, 140.13, 141, 141.2
See application file for complete search history.

(56) References Cited

U.S. PATENT DOCUMENTS 6,333,367 B1 * 12/2001 Kato et al. .............. 523/409
6,572,962 B2 * 6/2003 Hodjat .................... 428/323

(Continued)

FOREIGN PATENT DOCUMENTS

| JP | A-04-282012 | 10/1992 |
| JP | U-05-077637 | 10/1993 |

(Continued)

OTHER PUBLICATIONS

International Search Report issued in Application No. PCT/JP2010/000536; Dated Mar. 30, 2010 (With Translation).

(Continued)

*Primary Examiner* — Thomas J Williams
(74) *Attorney, Agent, or Firm* — Oliff PLC

(57) ABSTRACT

A method of manufacturing a bushing assembly that includes a vibration damping rubber bushing having a round cylindrical resin outer cylinder, which is assembled by press fitting an outside peripheral face of the outer cylinder in an axial direction into a cylindrical metal mated component having a circular inside peripheral face. The vibration damping rubber bushing is press fit into the mated component with a rigid powder composed of material harder than the outer cylinder deposited in a section of the resin outer cylinder that is situated on the outside peripheral face and that mates with the inside peripheral face of the mated component, and the outer cylinder and the mated component are assembled in a mated condition such that the rigid powder intervenes between the outside peripheral face of the outer cylinder and the inside peripheral face of the mated component.

8 Claims, 10 Drawing Sheets

(56) References Cited

U.S. PATENT DOCUMENTS

| | | | |
|---|---|---|---|
| 7,581,721 B2* | 9/2009 | Kobayashi et al. | 267/141.2 |
| 2002/0041064 A1* | 4/2002 | Shinobu et al. | 267/140.11 |
| 2004/0108639 A1 | 6/2004 | Kato et al. | |
| 2006/0214340 A1* | 9/2006 | Mikami et al. | 267/141 |
| 2007/0013159 A1* | 1/2007 | Mestre | 384/420 |
| 2007/0145657 A1* | 6/2007 | Funano et al. | 267/292 |

FOREIGN PATENT DOCUMENTS

| | | |
|---|---|---|
| JP | U-06-069469 | 9/1994 |
| JP | A-2002-317844 | 10/2002 |
| JP | A-2004-176803 | 6/2004 |
| JP | A-2007-277371 | 10/2007 |
| JP | A-2008-156707 | 7/2008 |
| JP | A-2008-162317 | 7/2008 |

OTHER PUBLICATIONS

International Preliminary Report on Patentability issued in Application No. PCT/JP2010/000536; Dated Aug. 9, 2011.
Chinese Office Action dated Oct. 30, 2012 in Chinese Patent Application No. 201080003224.8 (with partial translation).
May 9, 2013 Office Action issued in Chinese Patent Application No. 201080003224.8 (with translation).
Sep. 24, 2013 Office Action issued in Chinese Patent Application No. 201080003224.8 (with translation).

* cited by examiner

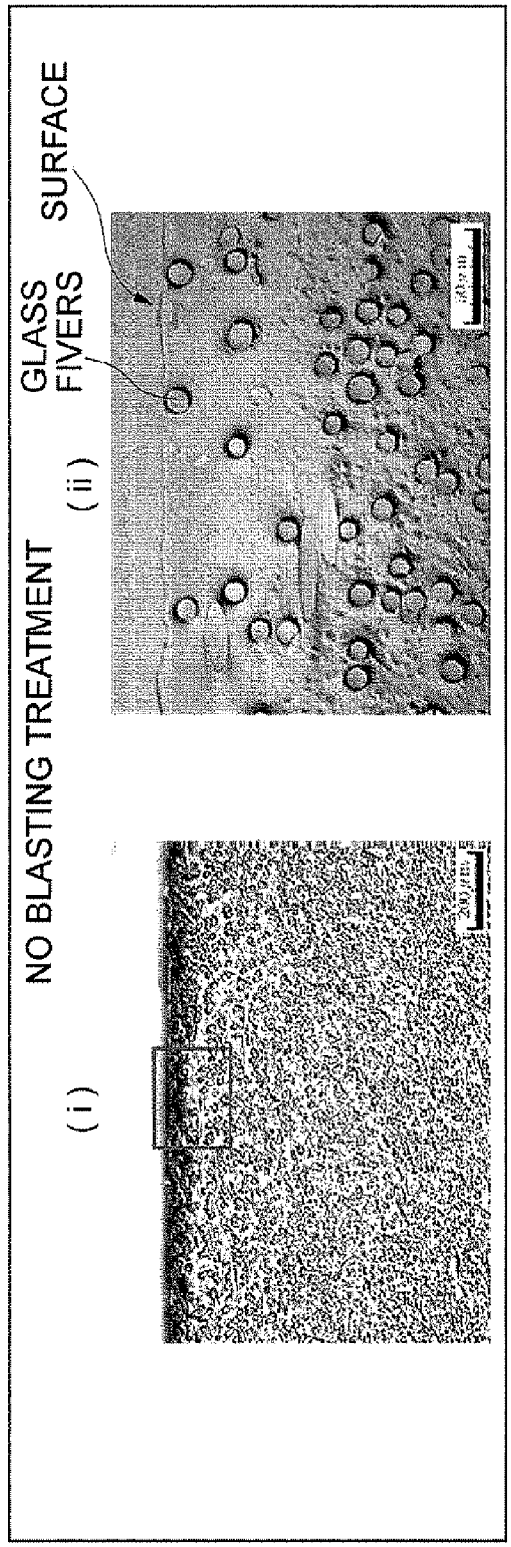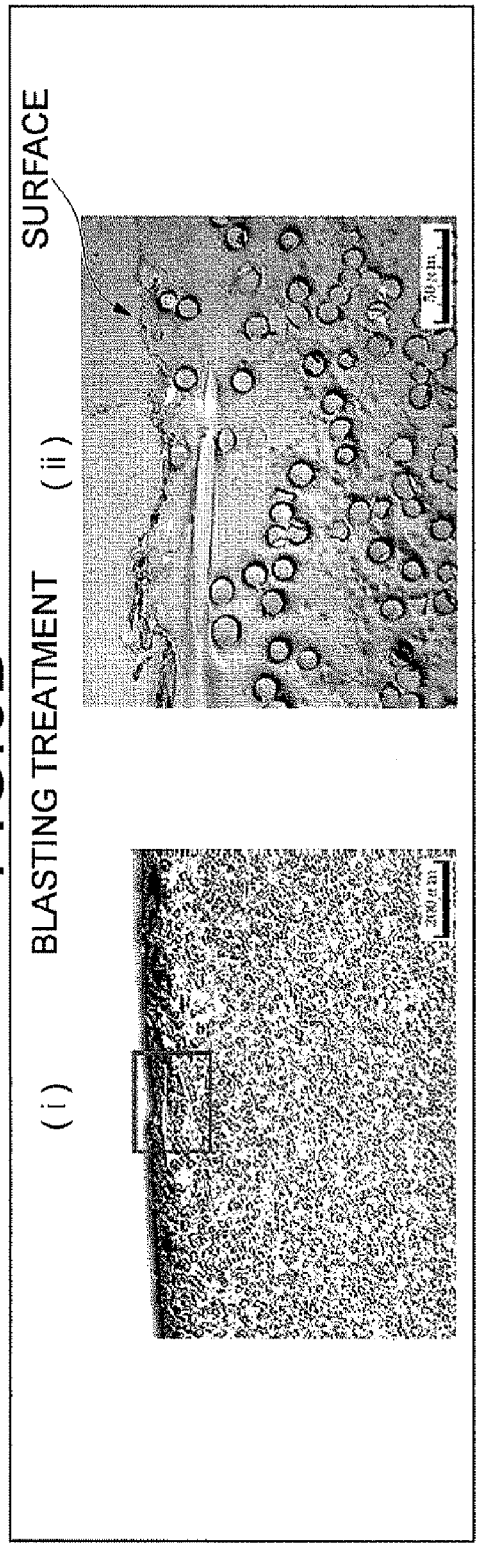

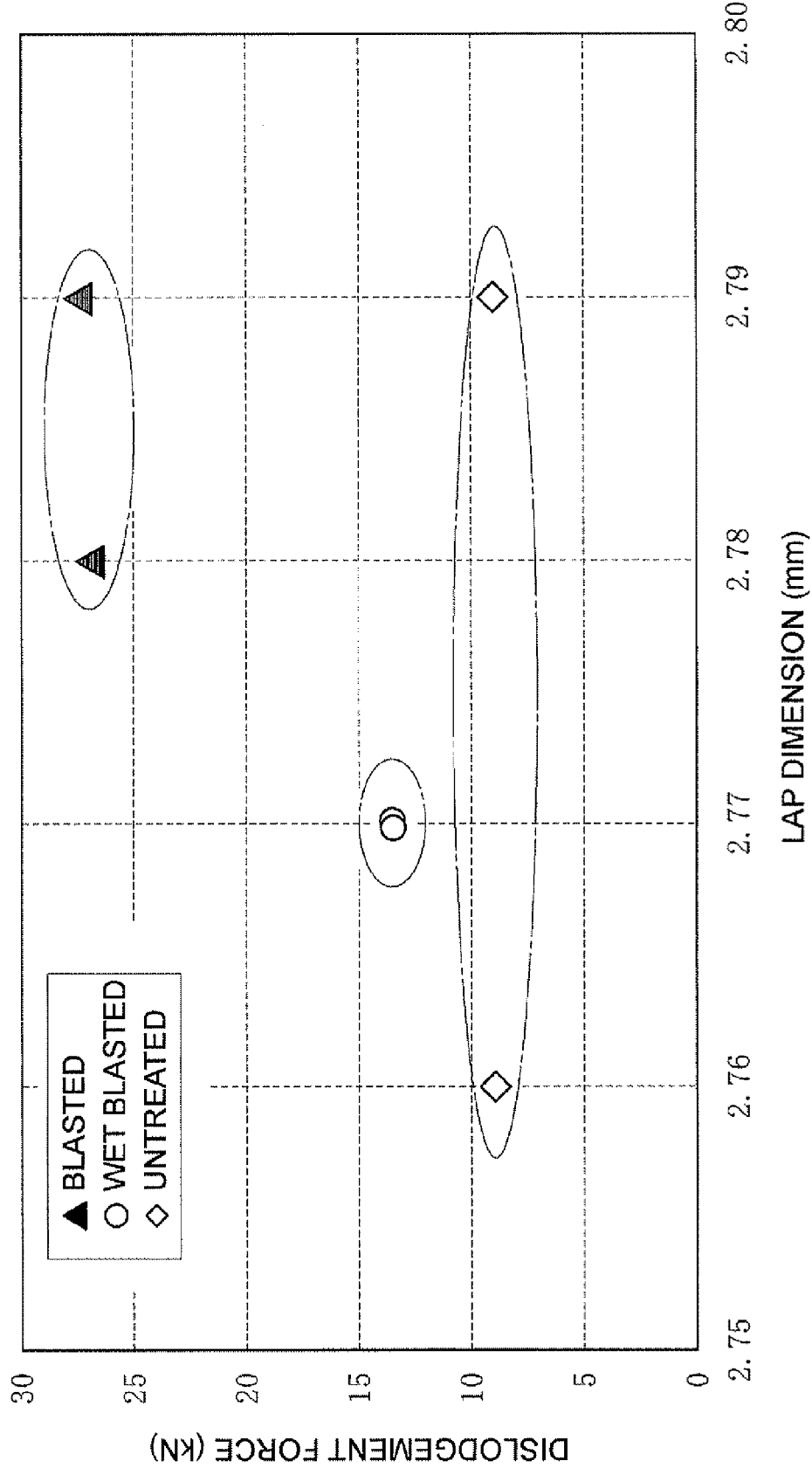

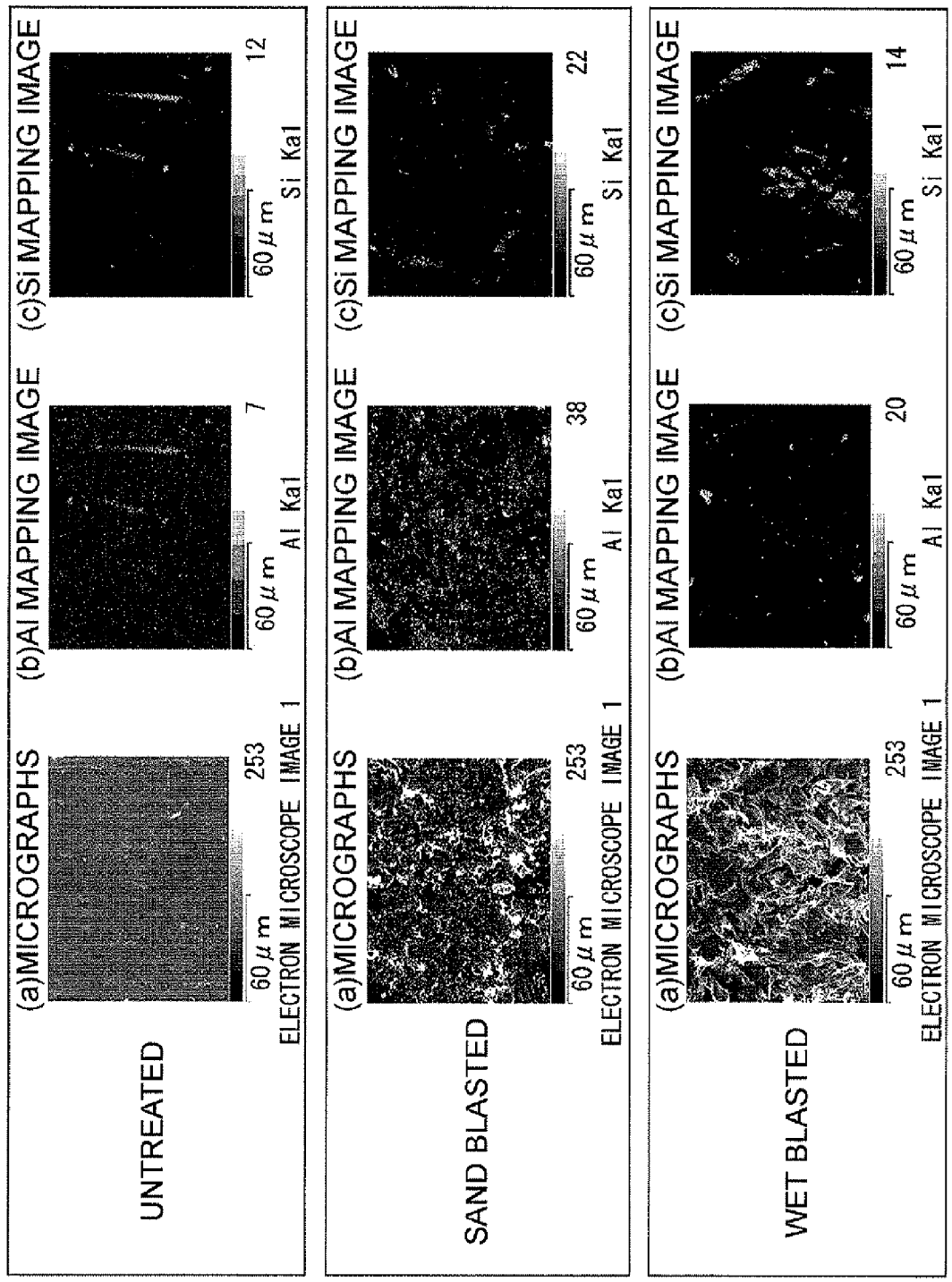

PRIOR ART

METHOD OF MANUFACTURING BUSHING ASSEMBLY AND VIBRATION DAMPING RUBBER BUSHING

TECHNICAL FIELD

This invention relates to a method of manufacturing a bushing assembly that is assembled by press fitting a vibration damping rubber bushing into a cylindrical mated component made of metal. The invention also relates to a vibration damping rubber bushing constituting a constituent component of the bushing assembly.

BACKGROUND ART

In the field of vibration damping rubber components for vehicles, vibration damping rubber bushings having a design that includes rigid, round outer and inner cylinders and a rubber elastic body integrally vulcanization bonded to the outer and inner cylinders to provide elastic linkage thereof enjoy widespread use as automotive trailing arm bushings, torque rod bushings, and the like.

Such a vibration damping rubber bushing is typically assembled to a cylindrical mated component made of metal and having a circular inside peripheral face, to construct a bushing assembly in which the outside peripheral face of the outer cylinder is press fit in the axial direction into the cylindrical mated component.

In the prior art, the outer cylinder of the vibration damping rubber bushing is made of metal, and when the vibration damping rubber bushing is press fit into the mated component with a prescribed level of lap dimension at the outside peripheral face of the metal outer cylinder, the resultant strong friction produced between the outside peripheral face of the outer cylinder and the inside peripheral face of the mated component serves to prevent the vibration damping rubber bushing from becoming dislodged from or rotating within the mated component.

More recently, with the aim of reducing weight, the use of resin for the outer cylinder of vibration damping rubber bushings has been contemplated. In such cases however, if the outer cylinder of the vibration damping rubber bushing is simply assembled to the mated component by press fitting, that is, if the vibration damping rubber bushing is secured to the mated component merely through frictional force acting between the outside peripheral face of the resin outer cylinder and the inside peripheral face of the mated component, even if the press fit initially has the prescribed level of lap dimension, the fastening force, i.e. the level of force that will dislodge the vibration damping rubber bushing from the mated component, will be low, thus posing the risk that if subjected to an outside force, the vibration damping rubber bushing may become mispositioned with respect to the mated component, or in some instances dislodged entirely.

To date, various different strategies for addressing this issue in vibration damping rubber bushings that employ a resin outer cylinder have been studied and proposed. One example is depicted in FIG. 10 (disclosed in Patent Citation 1 below). In the drawing, 200 denotes a vibration damping rubber bushing composed of a round outer cylinder 202 made of resin, an inner cylinder 204 made of metal, and a rubber elastic body 206 integrally vulcanization bonded to the outer cylinder 202 and the inner cylinder 204 providing elastic linkage between them.

208 denotes a mated component of cylindrical shape made of metal and having a circular inside peripheral face. The vibration damping rubber bushing 200 is press fit in the axial direction into the mated component 208 so that the outside peripheral face of the outer cylinder 202 is held fitting therein. The resin outer cylinder 202 has a flange portion 210 of annular form at one axial end (the bottom end in the drawing), and through abutment of this flange portion 210 against the axial end face of the mated component 208, the vibration damping rubber bushing 200 is prevented from becoming dislodged in the upward direction in FIG. 10.

The outer cylinder 202 in the section thereof that is situated at its other axial end to the opposite side and that protrudes out in the axial direction from the mated component 208 has partially thick-walled interlocking portion (detent portion) 218 provided with sloping faces 214, 216 that slope in mutually opposite directions. Once the vibration damping rubber bushing 200 is press fit into the mated component 208, this interlocking portion 218 interlocks with the axial end face of the mated component 210, and specifically interlocks with the axial end face on the opposite side from the flange portion 210, thereby preventing the vibration damping rubber bushing 200 from becoming dislodged from the mated component 208 in the downward direction in FIG. 10.

However, while the design depicted in FIG. 10 affords some improvement in terms of fastening force of the vibration damping rubber bushing 200 to the mated component 208 as compared with a vibration damping rubber bushing 200 devoid of special measures for this purpose, the extent of the improvement is minimal, so the level of force needed to dislodge the vibration damping rubber bushing 200 from the mated component 208 is not sufficiently high, and there is a risk that the vibration damping rubber bushing 200 may experience rotation relative to the mated component 208 in the rotational direction as well.

If the vibration damping rubber bushing 200 becomes mispositioned in the axial direction or experiences mispositioning in the rotational direction with respect to the mated component 208, the vibration damping rubber bushing 200 may fail to produce the intended intrinsic vibration damping function, and in some instances there is a risk of the vibration damping rubber bushing 200 becoming dislodged from the mated component 208 when subjected to outside force.

Another known approach disclosed in the prior art is a method which involves subjecting the inside peripheral face of the mated component to blasting treatment so as to increase surface roughness thereof. This is for the purpose of increasing the fastening force of the vibration damping rubber bushing to the mated component, and primarily the level of force needed to dislodge it.

For example, in paragraph [0038] of Patent Citation 2 below, it is disclosed to carry out blasting treatment of the inside peripheral face of the mated component of Comparative Example 2 of FIG. 7.

However, even such methods that involve imparting irregularities to the inside peripheral face of the mated component through blasting treatment do not afford sufficient improvement in the level of force needed to dislodge the vibration damping rubber bushing.

PRIOR ART DOCUMENT

Patent Citation

Patent Citation 1: JP-U 5-77637
Patent Citation 2: JP-A 2004-176803

SUMMARY OF THE INVENTION

Problem the Invention Attempts to Solve

With the foregoing in view, an object of the present invention is to provide a method of manufacturing a bushing assembly affording dramatically improvement in the dislodgement force of a vibration damping rubber bushing of cylindrical shape made of resin from a mated component; as well as a vibration damping rubber bushing constituting a constituent component thereof.

Means for Solving the Problem

A first mode of the present invention relating to a method of manufacturing a bushing assembly provides a method of manufacturing a bushing assembly that includes a vibration damping rubber bushing having a round cylindrical resin outer cylinder, a rigid inner cylinder, and a rubber elastic body integrally vulcanization bonded to the outer cylinder and the inner cylinder and providing elastic linkage thereof, which is assembled by press fitting an outside peripheral face of the outer cylinder in an axial direction into a cylindrical metal mated component having a circular inside peripheral face, the method being characterized by comprising the steps of press fitting the vibration damping rubber bushing into the mated component with a rigid powder composed of material harder than the outer cylinder deposited in a section of the resin outer cylinder that is situated on the outside peripheral face and that mates with the inside peripheral face of the mated component; and assembling the outer cylinder and the mated component in a mated condition such that the rigid powder intervenes between the outside peripheral face of the outer cylinder and the inside peripheral face of the mated component.

A second mode of the invention relating to a method of manufacturing a bushing assembly provides a method of manufacturing a bushing assembly according to the first mode of the invention relating to a method of manufacturing a bushing assembly, wherein the vibration damping rubber bushing is press fit into the mated component after the rigid powder has been deposited in an embedded condition on the outside peripheral face of the outer cylinder and retained on the outside peripheral face.

A third mode of the present invention relating to a method of manufacturing a bushing assembly provides a method of manufacturing a bushing assembly according to the second mode of the invention relating to a method of manufacturing a bushing assembly, wherein the outside peripheral face of the outer cylinder is subjected to blasting treatment, and the rigid powder which is employed as projectile material is deposited in an embedded condition on the outside peripheral face of the outer cylinder and retained on the outside peripheral face.

A fourth mode of the present invention relating to a method of manufacturing a bushing assembly provides a method of manufacturing a bushing assembly according to any one of the first to third modes of the invention relating to a method of manufacturing a bushing assembly, wherein the rigid powder comprises a ceramic powder.

A fifth mode of the present invention relating to a method of manufacturing a bushing assembly provides a method of manufacturing a bushing assembly according to the fourth mode of the invention relating to a method of manufacturing a bushing assembly, wherein the rigid powder comprises alumina powder.

A sixth mode of the present invention relating to a method of manufacturing a bushing assembly provides a method of manufacturing a bushing assembly according to any one of the first to fifth modes of the invention relating to a method of manufacturing a bushing assembly, wherein a resin coating of epoxy resin is formed on the inside peripheral face of the mated component by cationic electrodeposition coating.

A first mode of the present invention relating to a vibration damping rubber bushing provides a vibration damping rubber bushing including a round cylindrical resin outer cylinder, a rigid inner cylinder, and a rubber elastic body integrally vulcanization bonded to the outer cylinder and the inner cylinder and providing elastic linkage thereof, and being adapted to be assembled with an outside peripheral face of the outer cylinder press fit in an axial direction into a cylindrical metal mated component having a circular inside peripheral face, the vibration damping rubber bushing being characterized in that: a rigid powder composed of material harder than the outer cylinder is deposited in a section of the resin outer cylinder that is situated on the outside peripheral face and that mates with the mated component.

A second mode of the present invention relating to a vibration damping rubber bushing provides a vibration damping rubber bushing according to the first mode of the present invention relating to a vibration damping rubber bushing, wherein the rigid powder is deposited on the outside peripheral face of the outer cylinder in an embedded condition on the outside peripheral face.

A third mode of the present invention relating to a vibration damping rubber bushing provides a vibration damping rubber bushing according to the second mode of the present invention relating to a vibration damping rubber bushing, wherein the rigid powder is deposited in an embedded condition on the outside peripheral face of the outer cylinder through blasting treatment of the outside peripheral face employing the rigid powder as projectile material.

A fourth mode of the present invention relating to a vibration damping rubber bushing provides a vibration damping rubber bushing according to any one of the first to third modes of the present invention relating to a vibration damping rubber bushing, wherein the rigid powder comprises a ceramic powder.

A fifth mode of the present invention relating to a vibration damping rubber bushing provides a vibration damping rubber bushing according to the fourth mode of the present invention relating to a vibration damping rubber bushing, wherein the rigid powder comprises alumina powder.

Effects of the Invention

As will be appreciated from the description above, according to the first mode of the invention relating to a method of manufacturing a bushing assembly, a rigid powder of a rigid material harder than the outer cylinder is deposited on the vibration damping rubber bushing in the section of the resin outer cylinder that is situated on the outside peripheral face and that mates with the inside peripheral face of the mated component, and the vibration damping rubber bushing is then press fit into the mated component so that the outer cylinder and the mated component are assembled in a mated condition with the rigid powder intervening between the outside peripheral face of the resin outer cylinder and the inside peripheral face of the mated component. As will be clear from the discussion below, it has been found that according to the present invention, the dislodgement force of the vibration damping rubber bushing from the mated component may be dramatically increased.

As a possible reason for this, it is contemplated that press fitting into the mated component causes the rigid powder deposited on the outside peripheral face of the resin outer cylinder to become embedded into the outside peripheral face of the outer cylinder, and under the strong clamping force produced by press fitting, the portions that protrude out from the outside face of the outer cylinder are forcefully pressed at least in the diametrical direction into the inside peripheral face of the cylindrical mated component or become embedded into the inside peripheral face of the mated component, whereby the dislodgement force of the vibration damping rubber bushing from the mated component (and the resistance in the rotation direction) is dramatically increased as a result of the anchoring action of the rigid powder.

In the present invention, any of various different materials may be used for the resin outer cylinder of the vibration damping rubber bushing. More specifically, thermoplastic resins or thermosetting resins may be employed as the constituent resin of the outer cylinder, with thermoplastic resins being especially preferred for their excellent impact strength and moldability.

Examples of thermoplastic resins are polyamides (including aromatic polyamides and modified polyamides), polyesters (including modified polyesters), polypropylene, polycarbonate, polyacetal, polyphenylene sulfide, modified polyphenylene ether, and the like, with polyamides being especially preferred for their excellent balance of strength, reinforcing action of filler materials, and cost.

Exemplary filler materials incorporated or blended into such resin materials for the purpose of reinforcing the resin material include glass fibers, carbon fibers, aramid fibers, boron fibers, alumina fibers, metal fibers, silicon carbide fibers, glass beads, whisker, wollastonite, kaolinite, talc, mica, and carbon nanotubes, as well as lamellar phyllosilicates composed of layers of magnesium silicate or aluminum silicate, e.g. montmorillonite, hectorite, vermiculite, halloysite and the like, with glass fibers being especially preferred for their good reinforcing action and low cost. Depending on the usage area, unreinforced resin material devoid of filler material may be used as well. In preferred practice, the resin material of the invention is polyamide 66 (PA66) containing glass fiber filler material blended into the polymer base at a level of at least 30% (mass %), preferably at least 40%.

While the rigid powder may be either a metal or inorganic material, inorganic materials are preferred. As inorganic materials, ceramics, quartz sand, slag (refining slag from mineral ores) or other classes of materials may be employed, and more specifically ceramic materials of alumina, silicon carbide, silicon nitride, zircon, and glass, with ceramic materials that are harder than metal being especially preferred.

Where a material harder than metal is used, it may be anticipated that the material will embed more readily and with greater embedment force into the metal face of the inside peripheral face of the mated component. When depositing the rigid powder on the outside peripheral face of the resin outer cylinder, it is preferable to perform the rigid powder deposition process over a surface area equivalent to at least 20% of the mating face of the outside peripheral face with the mated component.

According to the first mode of the invention relating to a method of manufacturing a bushing assembly, in preferred practice the rigid powder is embedded beforehand into the outside peripheral face of the resin outer cylinder and retained in this condition on the outside peripheral face (second mode of the invention relating to a method of manufacturing a bushing assembly). By so doing, shedding of the rigid powder deposited on the outside peripheral face of the resin outer cylinder from the outside peripheral face prior to press fitting may be effectively prevented.

The outside peripheral face of the outer cylinder may be subjected to blasting treatment so that the rigid powder employed as projectile material is embedded into the outside peripheral face of the resin outer cylinder and retained thereon (third mode of the invention relating to a method of manufacturing a bushing assembly). While blasting treatment of the cylindrical mated component was practiced in the prior art, blasting treatment for the express purpose of depositing rigid powder on the resin outer cylinder as taught in the third mode of the invention relating to a method of manufacturing a bushing assembly was not practiced.

According to the third mode of the invention relating to a method of manufacturing a bushing assembly, by depositing rigid powder on the outside peripheral face of the outer cylinder through blasting treatment in this way, the rigid powder may be effectively embedded into the outside peripheral face of the outer cylinder due to colliding force when projected, thereby affording enhanced anchoring action with enhanced holding force.

The rigid powder may be deposited in a uniformly distributed and embedded condition over the entire outside peripheral face of the outer cylinder, and more specifically the entire mating face with the mated component, whereby the quality of fastening of the vibration damping rubber bushing to the mated component through press fitting may be improved.

It is especially preferable to use one of the ceramic based rigid powders listed above as the rigid powder during this blasting treatment. Where such a ceramic rigid powder is employed as the projectile material, particle size of the powder grains is progressively reduced as the grains repeatedly bounce against the workpiece being sandblasted, i.e. the outside peripheral face of the resin outer cylinder, and against the receptacle housing the workpiece, that is, as the grains split and fracture in the course of repeated blasting.

As a result, the projectile material typically has a particle size distribution of given breadth. In this case, while particles of larger size are highly effective in texturing the surface of the outer cylinder, because they also tend to rebound upon impact against the outside peripheral face of the outer cylinder, the efficiency of retention on the outside peripheral face of the outer cylinder is low. Meanwhile, while particles of smaller size have minimal effect in roughening the outside peripheral face of the outer cylinder, they also tend not to rebound, and readily embed into the outside peripheral face of the outer cylinder to become retained there. In particular, those particles that embed themselves within pits formed by the larger particles resist shedding from the outside peripheral face of the outer cylinder, so holding power tends to be improved.

In the third mode of the invention relating to a method of manufacturing a bushing assembly, while it is possible to use a metal such as steel as the projectile material, steel and other metals have excessively strong impact force against the resin outer cylinder, posing a risk of cracking of the outer cylinder. In this regard, it is preferable to employ a projectile material of a hard ceramic powder which is lighter than steel and other metals, and especially alumina powder, depositing this material in an embedded condition in the outside peripheral face of the outer cylinder.

The ceramic powder, preferably alumina powder, readily undergoes fracture of the powder particles when blasted, and this fracturing process results in angular shapes whose corners readily embed into the outside peripheral face of the outer cylinder.

According to the manufacturing method of the present invention, regardless of whether or not the rigid powder is deposited by the blasting process described above, it is preferable to use ceramic powder as the rigid powder (fourth mode of the invention relating to a method of manufacturing a bushing assembly); and among ceramic powders, it is especially preferable to use alumina powder (fifth mode of the invention relating to a method of manufacturing a bushing assembly).

In the present invention, during press fitting of the vibration damping rubber bushing into the mated component, it is preferable to form in advance a resin coating of epoxy resin on the inside peripheral face of the mated component by cationic electrodeposition coating (sixth mode of the invention relating to a method of manufacturing a bushing assembly).

In the present invention, if the vibration damping rubber bushing is press fit against the exposed metal of the inside peripheral face of the mated component not subjected to cationic coating, dislodgement force is increased nevertheless due to the action of the rigid powder deposited on the outside peripheral face of the resin outer cylinder member. However, as will become apparent later, forming a resin coating of epoxy resin on the inside peripheral face of the mated component by cationic electrodeposition coating as described above has been found to dramatically improve dislodgement force of the vibration damping rubber bushing.

Cationic electrodeposition coating may be accomplished by immersing the article for coating (in this instance, the metal mated component) in a tank filled with a solution of electrodeposition coating material; applying voltage across the article as the cathode and an anode that is immersed in the tank so that the coating material particles undergo electrophoretic migration towards the article being coated and become deposited thereon through an electrochemical reaction to form a film; and then hardening the film through baking to form a uniform, firmly adhered film of coating material particles on the inside peripheral face of the mated component. The film of epoxy resin formed in this manner is itself hard and very strong.

The dramatic increase in dislodgement force of the vibration damping rubber bushing observed when a resin film is formed on the inside peripheral face of the mated component by cationic electrodeposition coating in this way is attributed to the rigid powder deposited on the resin outer cylinder becoming embedded into the coating film on the inside peripheral face of the mated component, thereby effectively increasing the higher dislodgement force of the vibration damping rubber bushing.

In order to increase the dislodgement force of the vibration damping rubber bushing through embedment of the rigid powder into the coating film on the inside peripheral face of the mated component, it is necessary for the resin coating film to bond to the mated component at a level of strength sufficient to withstand dislodgement force of the vibration damping rubber bushing, and for the coating film per se to have high strength; resin coating films of epoxy resin produced by cationic electrodeposition coating meet these requirements. It is preferable to use rigid powder having higher hardness than the resin coating film of the epoxy resin, in order to achieve increased dislodgement force through embedment of the rigid powder into the resin coating film.

The discussion now turns to the first to fifth modes of the invention relating to a vibration damping rubber bushing, which relate to a vibration damping rubber bushing constituting a component of the bushing assembly in the invention relating to a method of manufacturing a bushing assembly. This vibration damping rubber bushing has rigid powder deposited on the outside peripheral face of the resin outer cylinder, thereby affording strong fastening force in relation to the mated component when the vibration damping rubber bushing is press fitted into the mated component, making it possible to attain dramatically higher dislodgment force as compared with the prior art.

BRIEF DESCRIPTION OF THE DRAWINGS

FIGS. 6A and 6B are micrographs showing comparisons of surface conditions of outer cylinders in cross section, with and without blasting treatment.

FIG. 7 is a graph showing the relationship of blasting treatment and dislodgement force.

FIGS. 8A-8C are micrographs, Al mapping images, and Si mapping images showing a comparison of surface conditions on the outside peripheral face of outer cylinders, with and without blasting treatment.

EMBODIMENTS FOR CARRYING OUT THE INVENTION

Figure 1A:
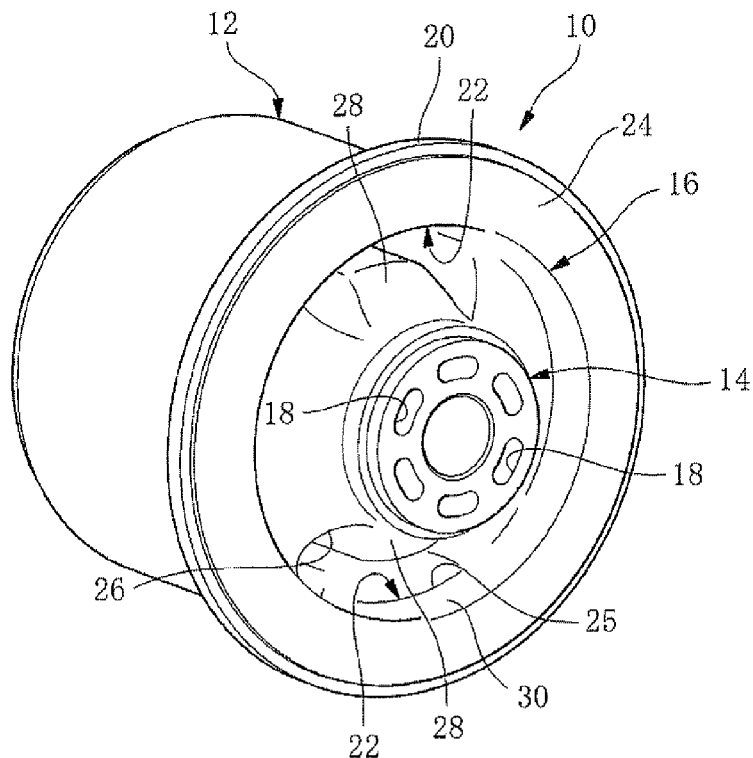
FIGS. 1A and 1B are views of a vibration damping rubber bushing according to an embodiment of the invention.
Figure 1B:
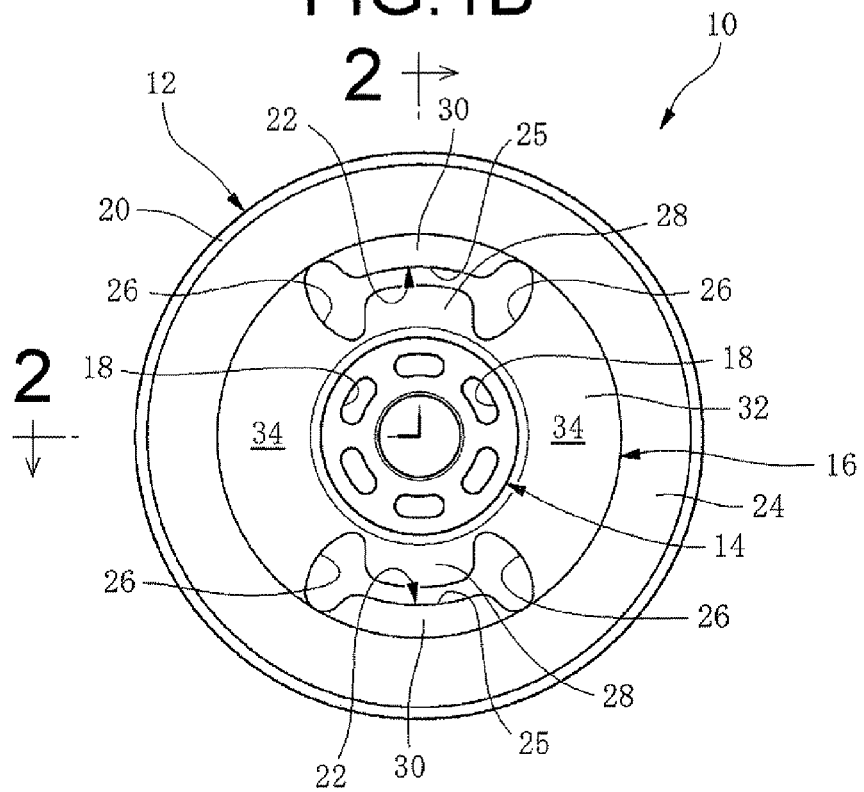
Figure 2:
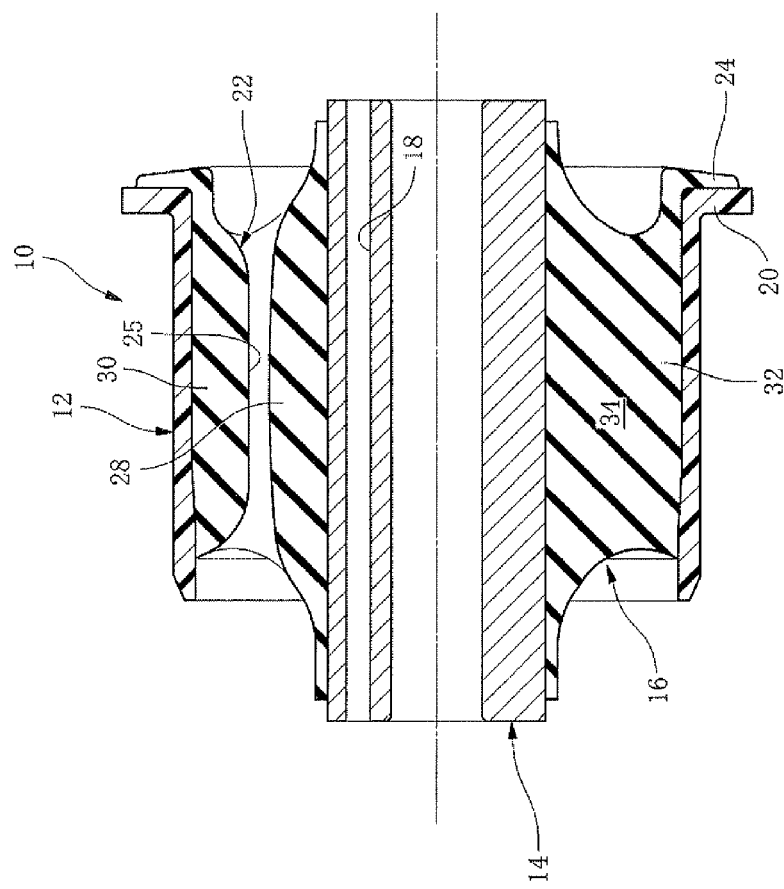
FIG. 2 is a sectional view of FIG. 1B.
Figure 10:
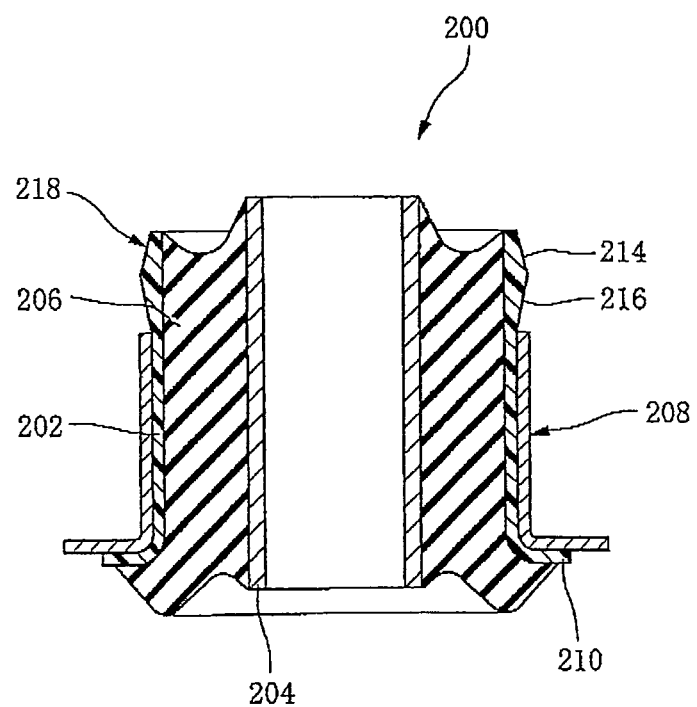
FIG. 10 is a view depicting an example of a vibration damping rubber bushing of the prior art.

The present invention is described in detail below based on an embodiment of the vibration damping rubber bushing and an assembly thereof in a rear trailing arm bushing for an automobile, with reference to the accompanying drawings. In FIGS. 1 and 2, 10 denotes the vibration damping rubber bushing of the present embodiment, which includes an outer cylinder 12 of round cylindrical shape, an inner cylinder 14 likewise of round cylindrical shape, and a rubber elastic body 16 integrally vulcanization bonded to the outer cylinder 12 and the inner cylinder 14 to provide elastic linkage between them. The inner cylinder 14 is composed of an extruded piece of metal, in this case aluminum alloy, and has a plurality of voids 18 situated along the circumferential direction passing through the axial direction.

The outer cylinder 12 on the other hand is a resin component made of a hard resin. In this case, polyamide 66 resin is employed as the resin. The polyamide 66 resin contains glass fiber reinforcing material at a level of 33 mass % of the polymer base. It is possible for the outer cylinder 12 to be made from some other resin material. At one axial end (the right end in FIG. 2) of the outer cylinder 12 there is integrally formed a flange portion 20 protruding outward in the diametrical direction and having annular appearance in the circumferential direction.

The rubber elastic body 16 is also round cylindrical in shape about its axis. The rubber elastic body 16 is provided with a pair of hollow portions 22 that pass through in the axial direction and are disposed in opposition to one another to either side of the inner cylinder 14 in the axis-perpendicular direction as shown in FIG. 1B. Specifically, the hollow portions 22 are provided at two locations spaced apart by 180° in the circumferential direction. As depicted in FIG. 2, the rubber elastic body 16 is provided with a rubber flange portion 24 disposed overlapping the flange portion 20 of the outer cylinder 12.

As depicted in FIG. 1B, the hollow portions 22 have a slit portion 25 that extends along an arcuate path in the circumferential direction, and, respectively formed at the two termini of this slit portion 25, a pair of terminus portions 26 of recessed diametrically inward and outward. In FIG. 1B, the pair of hollow portions 22 have a vertically symmetric arrangement. Also in FIG. 1B, the terminus portions 26 and the slit portion 25 in each hollow portion 22 are left-right symmetrical.

The rubber elastic body 16 is also provided with inside peripheral side rubber stopper portions 28 and outside peripheral side rubber stopper portions 30 situated in opposition in the diametrical direction to either side of the hollow portions 22. When the inner cylinder 14 and the outer cylinder 12 experience relative displacement in the vertical direction in FIG. 1B, these inside peripheral side rubber stopper portions 28 and outside peripheral side rubber stopper portions 30 come into abutment, and the resultant stopper action serves to limit excessive relative displacement in the vertical direction.

32 denotes a rubber main body that through elastic deformation gives rise to intrinsic vibration damping action. In the axis-perpendicular direction orthogonal to the direction of opposition of the pair of hollow portions 22, the vibration damping rubber bushing 10 in the section thereof between the outer cylinder 12 and the inner cylinder 14 is infilled by the rubber main body 32, with this section constituting a solid portion. The solid portion is indicated by symbol 34 in the drawings.

Figure 3:
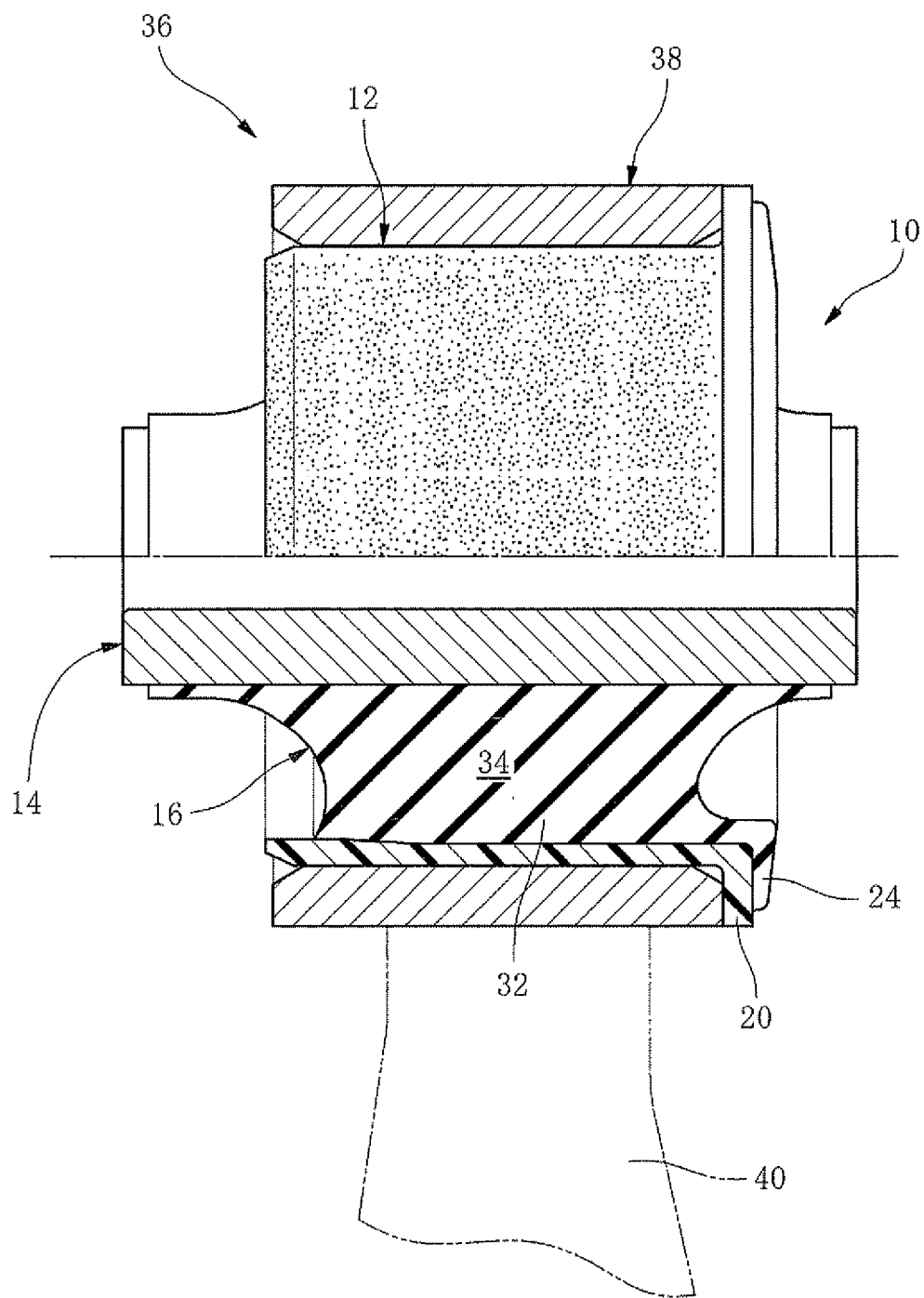
FIG. 3 is a partially sectional side view showing the vibration damping rubber bushing of the embodiment in the form of a bushing assembly.

In FIG. 3, 38 denotes a mated component for attachment of the vibration damping rubber bushing 10. This mated component 38 takes the form of a round cylinder of metal having a circular inside peripheral face, with an arm 40 extending out from the mated component 38. FIG. 3 is a drawing that corresponds to FIG. 2, and shows the outside peripheral face of the outer cylinder 12 as it appears at one side of the centerline (the upper side in FIG. 3). The vibration damping rubber bushing 10 is press fit in the axial direction with a prescribed level of lap dimension at the outside peripheral face of the outer cylinder 12 in relation to the inside peripheral face of the mated component 38, and is retained fitting together with this mated component 38. The vibration damping rubber bushing 10 is attached to the mated component 38 to produce a bushing assembly 36.

The bushing assembly 36 according to the present embodiment is manufactured by the manufacturing method below. Specifically, in the present embodiment, with a rigid powder of a material that is harder than the resin outer cylinder 12 deposited on the face intended to fit together with the mated component 38, the vibration damping rubber bushing 10 is attached through press fitting to the mated component 38, to produce the bushing assembly 36. The outer cylinder 12 and the mated component 38 are thereby assembled fitting together with the rigid powder intervening between the outside peripheral face of the outer cylinder 12 and the inside peripheral face of the mated component 38, to manufacture the bushing assembly 36. In preferred practice the rigid powder is a ceramic powder, with alumina powder especially preferred. Also, it is preferable to produce by a cationic electrodeposition coating process a resin coating film of epoxy resin on the inside peripheral face of the mated component 38 that fits together with the outer cylinder 12.

According to this manufacturing method, the vibration damping rubber bushing 10 may be press fit into the mated component 38 with rigid powder simply deposited (i.e. without being embedded) on the outside peripheral face of the outer cylinder 12. Alternatively, the vibration damping rubber bushing 10 may be press fit and attached to the mated component 38 after the outside peripheral face of the outer cylinder 12 has been subjected to blasting treatment so that rigid powder employed as the projectile material is deposited in an embedded condition into the outside peripheral face of the outer cylinder 12 and retained on the outside peripheral face of the outer cylinder 12.

In the former instance, in some cases the rigid powder may be deposited onto the outside peripheral face of the unassembled resin outer cylinder 12 at some stage prior to vulcanization molding of the vibration damping rubber bushing 10. However, the typical procedure is to deposit the rigid powder on the outside peripheral face of the outer cylinder 12 subsequent to vulcanization molding of the vibration damping rubber bushing 10.

Figure 4A:
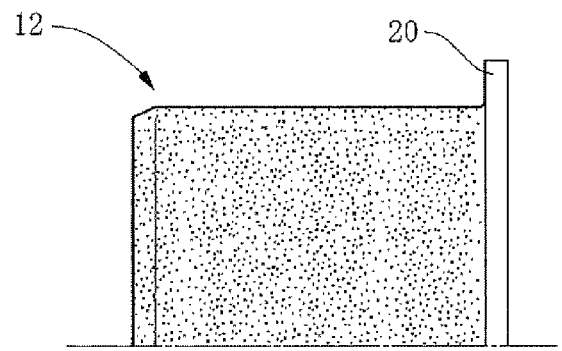
FIGS. 4A-4C are illustrations of the assembly procedure of the bushing assembly of the embodiment.
Figure 4B:
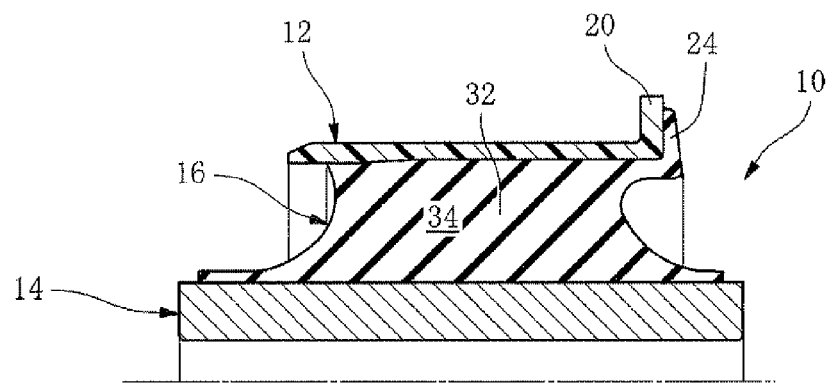
Figure 4C:
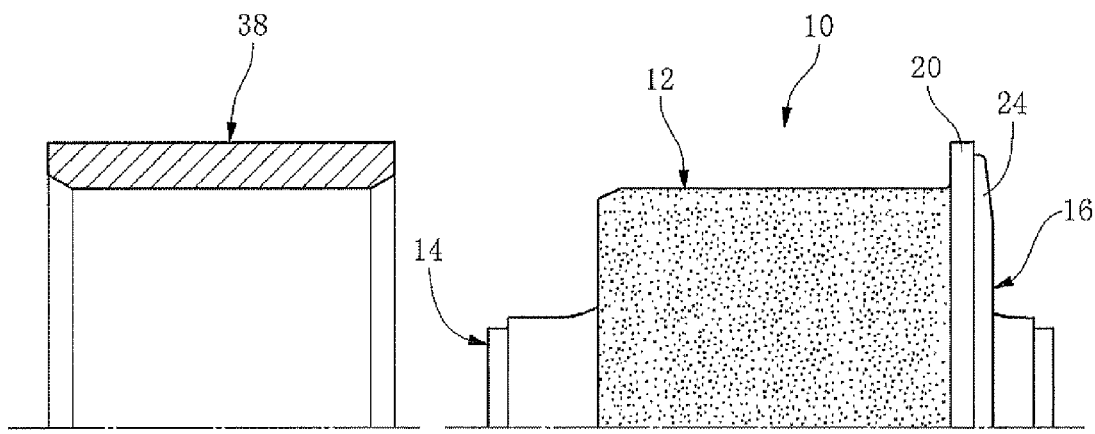

Meanwhile, where the rigid powder has been deposited in an embedded condition onto the outside peripheral face of the outer cylinder 12 through blasting treatment, an advantageous process is one whereby prior to vulcanization molding of the vibration damping rubber bushing 10 as depicted in FIGS. 4A-4C, the unassembled resin outer cylinder 12 is subjected to blasting treatment (FIG. 4A) to deposit the rigid powder on its outside peripheral face. The vibration damping rubber bushing 10 is then vulcanization molded using this outer cylinder 12 (FIG. 4B); and the vulcanization molded vibration damping rubber bushing 10 is then press fit into the mated component 38 (FIG. 4C).

According to the present embodiment, fastening force of the vibration damping rubber bushing 10 to the mated component 38 may be attained for a high level of strength, and it is possible to dramatically increase dislodgement force of the vibration damping rubber bushing 10 from the mated component 38.

Specific verification of this point is present below.

The inventors contemplated first imparting irregular shape (increasing surface roughness) on the outside peripheral face of the outer cylinder 12 in order to increase dislodgement force of the vibration damping rubber bushing 10, and to this end carried out blasting treatment (pneumatic sand blasting treatment) of the outer cylinder 12 using alumina powder as the projectile material, which demonstrated that dislodgement force of the vibration damping rubber bushing 10 was dramatically improved thereby.

In order to ascertain whether imparting irregular shape (roughening the surface, i.e. increasing surface roughness) at the outside peripheral face of the outer cylinder 12 really has the effect of increasing dislodgement force of the vibration damping rubber bushing 10, the following possibilities (a) through (c) were examined.

(a) The possibility that dislodgement force may be improved by including glass fibers in the outer cylinder 12, and carrying out blasting treatment to produce a raised nap of glass fibers exposed at the surface.

(b) The possibility that dislodgement force may be improved by roughening the outside peripheral face of the outer cylinder 12 through blasting treatment.

(c) The possibility that dislodgement force of the vibration damping rubber bushing 10 may be improved by embedding projectile material into the outside peripheral face of the outer cylinder 12 through blasting treatment, giving rise as a result to anchoring effect in the press fitted condition, due to intervening projectile material between it and the mated component.

I. Observation of Outer Cylinder 12 Cross Section

First, with regard to point (a) above, i.e. to ascertain whether a nap of glass fibers may be raised on the surface through blasting treatment, a lateral section of the outer cylinder 12 was observed by SEM (scanning electron microscope), both for specimens not subjected to blasting treatment and for specimens subjected to blasting treatment. Results are presented in FIGS. 6A and 6B.

As shown in FIG. 6A, specimens that did not undergo blasting treatment have a smooth surface, whereas specimens that underwent blasting treatment as a matter of course have a surface in a roughened condition, that is, with deep irregularities formed on the surface.

Blast treatment was carried out under the conditions below.

Projectile material: alumina powder (FUJIRANDAMU A36 made by Fuji Manufacturing Co., Ltd. (initial particle size 595-500 μm) was used; chemical composition and Mohs' hardness are given in Table 1 below).

Blast pressure (air pressure): 0.57±0.1 MPa

Nozzle diameter: φ6.98-φ9.0 mm (mean diameter)

Device: Fuji Manufacturing Co., Ltd. model SG-4BL-304

TABLE 1

| (Chemical composition: mass %) | | | | | | | |
|---|---|---|---|---|---|---|---|
| Component | $Al_2O_3$ | $TiO_2$ | $SiO_2$ | $Fe_2O_3$ | $Na_2O$ | $ZrO_2$ | MgO |
| | 96.63 | 2.40 | 0.60 | 0.20 | 0.02 | 0.13 | 0.02 |

Absolute specific gravity 3.93 g/cm³
Morse hardness 9.0

As shown in FIGS. 6A and 6B, exposure and raised nap of glass fibers at the surface were not especially noted, which led to the discovery that improved dislodgement force of the vibration damping rubber bushing 10 is not caused by raised nap of glass fibers, i.e. resistance of glass fibers. In FIG. 6B(ii), clusters of black dots situated along irregular shapes of the surface are evident. These clusters of black dots are grains of the alumina used as the projectile material.

II. Effect of Surface Roughness on Dislodgement Force

Next, an examination was carried out with regard to point (b) above, i.e. to determine if improved dislodgement force of the vibration damping rubber bushing 10 is due to roughening of the surface of the outer cylinder 12 by blast treatment.

II-1. Surface Roughness Measurement Results (Numerical Values Given in Tables 2 and 3 Below Represent Mean Values for Two Measurements for a Sample Number n of 2.)

Specimens that did not undergo blasting treatment, specimens that underwent blasting treatment, and specimens that underwent wet blasting treatment (in this and subsequent tests, the entire face of the outer cylinder 12 underwent blasting treatment) were measured for surface roughness pre- and post-vulcanization.

Results are presented in Table 2 (Pre-vulcanization) and Table 3 (Post-vulcanization).

(1) Pre-Vulcanization

TABLE 2

| Pre-vulcanization (unit: μm) | | | | | | | | | |
|---|---|---|---|---|---|---|---|---|---|
| | Specimen | | | | | | | | |
| | No blasting | | | Sandblasted | | | Wet blasted | | |
| | No. 1 | No. 2 | Avg. | No. 1 | No. 2 | Avg. | No. 1 | No. 2 | Avg. |
| Ra | 0.6 | 0.7 | 0.7 | 2.7 | 2.1 | 2.4 | 3.8 | 4.2 | 4.0 |
| Rmax | 9.2 | 11.6 | 10.4 | 33.6 | 27.6 | 30.6 | 46.1 | 43.3 | 44.7 |
| Rz | 5.4 | 6.8 | 6.1 | 22.0 | 17.6 | 19.8 | 29.7 | 33.3 | 31.5 |

(2) Post-Vulcanization: Vulcanization Using Treated Articles Taken from the Same Lot as Articles Measured in Table 1 (Not Articles Measured in Table 1 and Subsequently Subjected to Vulcanization).

TABLE 3

| Post-vulcanization (unit: μm) | | | | | | | | | |
|---|---|---|---|---|---|---|---|---|---|
| | Specimen | | | | | | | | |
| | No blasting | | | Sandblasted | | | Wet blasted | | |
| | No. 1 | No. 2 | Avg. | No. 1 | No. 2 | Avg. | No. 1 | No. 2 | Avg. |
| Ra | 0.7 | 0.9 | 0.8 | 1.9 | 1.7 | 1.8 | 1.8 | 2.4 | 2.1 |
| Rmax | 10.3 | 12.1 | 11.2 | 24.7 | 20.3 | 22.5 | 20.3 | 24.1 | 22.2 |
| Rz | 6.7 | 7.7 | 7.2 | 15.3 | 14.3 | 14.8 | 14.9 | 18.7 | 16.8 |

(3) Variability of Surface Roughness (Pre-Vulcanization)

Because blasting treatment was carried out simultaneously on a large number of outer cylinders 12, variability of surface roughness produced when blasting treatment was performed on a total of 105 articles was observed. Results are presented in Table 4. In Tables 2, 3, and 4, Ra denotes centerline mean surface roughness as specified in JIS B0601, Rmax denotes maximum height, and Rz denotes mean roughness at 10 points.

TABLE 4

| (unit: μm) | | |
|---|---|---|
| | Mean | Max. − Min. |
| Ra | 2.6 | 0.9 |
| Rmax | 32.4 | 12.0 |
| Rz | 23.8 | 9.7 |

(4) Relationship Between No Blast Treatment or Treatment Under Different Conditions, and Dislodgement Force Specimens that did not undergo blasting treatment, specimens that underwent blasting treatment by air jetting in a dry process, and specimens that underwent wet blasting treatment with a stream of water were measured for dislodgement force. The results are presented in Table 5 below.

TABLE 5

| Dislodgement force measurements | | | | | | |
|---|---|---|---|---|---|---|
| | Specimen | | | | | |
| | Blasting | | | | | |
| | Untreated | | Sandblasted | | Wet blasted | |
| Outer tube spec. No. | A | B | C | D | E | F |
| Product dia. pre-press fit (mm) | 71.59 | 71.62 | 71.60 | 71.60 | 71.59 | 71.60 |
| Jig internal dia. (mm) | 68.83 | 68.83 | 68.81 | 68.82 | 68.82 | 68.83 |
| Lap dimension (mm) | 2.76 | 2.79 | 2.79 | 2.78 | 2.77 | 2.77 |
| Dislodgement force (kN) | 8.90 | 9.10 | 27.30 | 26.80 | 13.50 | 13.60 |
| Product dia. after dislodging (mm) | 70.77 | 70.79 | 70.78 | 70.77 | 70.79 | 70.80 |
| Sinkage (mm) | 0.82 | 0.83 | 0.82 | 0.83 | 0.80 | 0.80 |

Dislodgement force measurements were made as follows.

Figure 5:
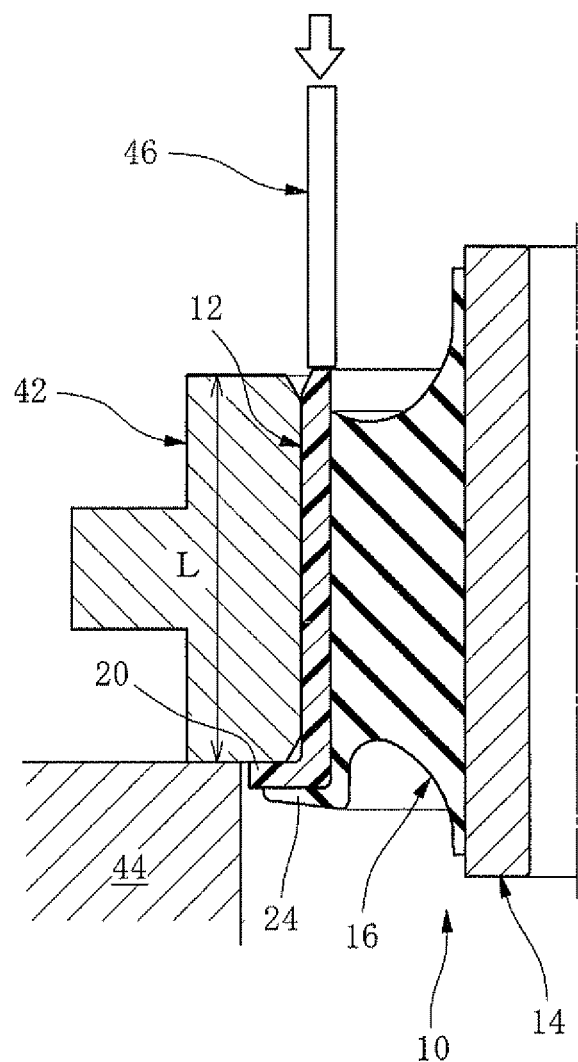
FIG. 5 is an illustration of a method of measuring dislodgement force of a vibration damping rubber bushing.

As depicted in FIG. 5, the vibration damping rubber bushing 10 was attached by press fitting to a metal jig 42 of round cylindrical shape having inside peripheral face contours substantially identical to those of the mated component 38. With the jig 42 placed on a base 44, pressing force was exerted in the dislodging direction on the outer cylinder 12 by a presser jig 46 while measuring the dislodgement force.

Measurements in the test were taken of specimens having a resin coating film of epoxy resin formed by cationic electrodeposition coating on the inside peripheral face of the cylindrical jig 42. The resin coating film formed by cationic electrodeposition coating was a film having thickness of between about 10 and 30 μm. The outside diameter of the outer cylinders 12 and the inside diameter of the jigs 42 are as indicated in Table 5. The length L of the jig 42 in the vertical direction in the drawing is 52 mm. The sinkage values given in Table 5 are values derived by subtracting the outside diameter after dislodgement in accordance with FIG. 5, from the initial outside diameter.

From Table 2 it may be appreciated that both the sandblasted specimens and the wet blasted specimens exhibit greater surface roughness than specimens not undergoing blasting treatment, and that the wet blasted specimens exhibit rougher surfaces than the sandblasted specimens. For example, in Table 2, specimens not undergoing blasting treatment have Rz of 6.1, whereas sandblasted specimens have Rz of 19.8 and wet blasted specimens have Rz of 31.5 (these are all mean values).

Accordingly, if greater surface roughness were associated with improved dislodgement force, the wet blasted specimens would be expected to show the greatest improvement in dislodgement force. However, in actual practice the results are different, as demonstrated by the results in Table 5.

Specifically, whereas dislodgement force values for specimens without blasting treatment is 8.90 kN and 9.10 kN, those for the wet blasted specimens are 13.50 kN and 13.60 kN respectively, and while this represents an improvement in dislodgement force compared to the untreated specimens, the extent of improvement is not that great.

For the sandblasted specimens on the other hand, dislodgement force values are 27.30 kN and 26.80 kN, so dislodgement force is appreciably higher than with the wet blasted specimens (wet blasted specimens have dislodgement force values approximately half that of sandblasted specimens).

The results are summarized in FIG. 7.

The results presented above led to the discovery that the outer cylinder 12 surface roughness per se does not appear to contribute to increased dislodgement force of the vibration damping rubber bushing 10. Accordingly, the reason for the dramatically higher dislodgement force observed with sandblasting treatment must lie elsewhere. As will be apparent from Table 3, surface roughness of the outer cylinder 12 reaches low levels with vulcanization. This is thought to result from the outer cylinder 12 being pressed against the inside face of the forming die during vulcanization, causing the outside peripheral face of the outer cylinder 12 to flatten out due to heat and pressure in the process.

III. Observation of Outer Cylinder 12 Surface (Outside Peripheral Face)

Next, an examination was carried out with respect to the preceding point (c), specifically, as to whether dislodgement force of the vibration damping rubber bushing 10 is improved through an anchoring effect created by projectile material embedded into the outside peripheral face of the outer cylinder 12.

III-1. Ascertaining Conditions of Outer Cylinder 12 Outside Peripheral Face by SEM Photography and Mapping Surfaces of specimens that did not undergo blasting treatment, sandblasted specimens, and wet blasted specimens were examined with a scanning electron microscope; and were also examined to ascertain the presence of Al derived from alumina ($Al_2O_3$) present on the surface, as well as to observe the presence and distribution of Si. The results are presented in FIG. 8.

A Hitachi scanning electron microscope S-3400N (made by Hitachi High Technologies Corp.) was used for the Al mapping and Si mapping, making measurements with an energy dispersive X-ray analyzer.

From these results may be ascertained that Al is present in considerable amounts in a dispersed condition on surfaces of sandblasted specimens, whereas Al is present only in small amounts on wet blasted specimens, with the amounts and distribution thereof being much less than for the sandblasted specimens.

From this it was ascertained that in the case of sandblasted specimens, alumina powder becomes deposited in large quantities on the surface (outside peripheral face) of the outer cylinder 12, whereas in the case of wet blasted specimens, virtually no alumina powder becomes deposited.

This difference observed between sandblasted specimens and wet blasted specimens is attributed to the fact that the alumina powder is sprayed with air in the case of sandblasting, whereas because wet blasting employs a stream of water, the alumina powder is washed away.

Moreover, because $Al_2O_3$ is also present in the glass fibers contained in the outer cylinder 12, Al observed at the same locations as Si in the Al mapping images and Si mapping images for the wet blasted specimens is thought to derive from the glass fibers.

III-2. Quantitative Analysis of Al by Fluorescent X-Ray Analysis

Next, specimens that did not undergo blasting treatment, sandblasted specimens, and wet blasted specimens underwent quantitative analysis by fluorescent X-ray analysis to determine the amount of alumina deposited on the surface (more precisely, the amount of Al present). The results are presented in Table 6.

TABLE 6

| Specimen | Untreated | Sandblasted | Wet blasted |
|---|---|---|---|
| Al quantitative analysis result (cps/μA) | 0.009 | 0.115 | 0.022 |

When a specimen is bombarded with X-rays during fluorescent X-ray analysis, fluorescent X-rays characteristic of particular elements are emitted. Accordingly, the elements can be identified from these fluorescent X-rays. The intensity of the emitted fluorescent X-rays is proportional to the concentrations of the elements, so quantitative analysis of elements can be accomplished by measuring these relative intensities. The results show that the amount of alumina-derived Al is 0.115 (cps/μA) with sandblasting treatment. Cps denotes counts per second, and represents the number of counts per one second.

IV. Results of Dislodgement Force Measurements for Different Surface Treatments

In order to ascertain the contribution of alumina powder to dislodgement force, specimens that did not undergo blasting and wet blasted specimens that were subjected to a coating process in which alumina powder was simply sprinkled on (applying the material over the entire outside peripheral face of the outer cylinder 12); and sandblasted specimens were subjected to a washing process of the surface (washing under a stream of water while scrubbing for three minutes per specimen using a nylon sponge). The specimens were then tested to verify the effects on dislodgement force of the vibration damping rubber bushing 10.

Figure 9:
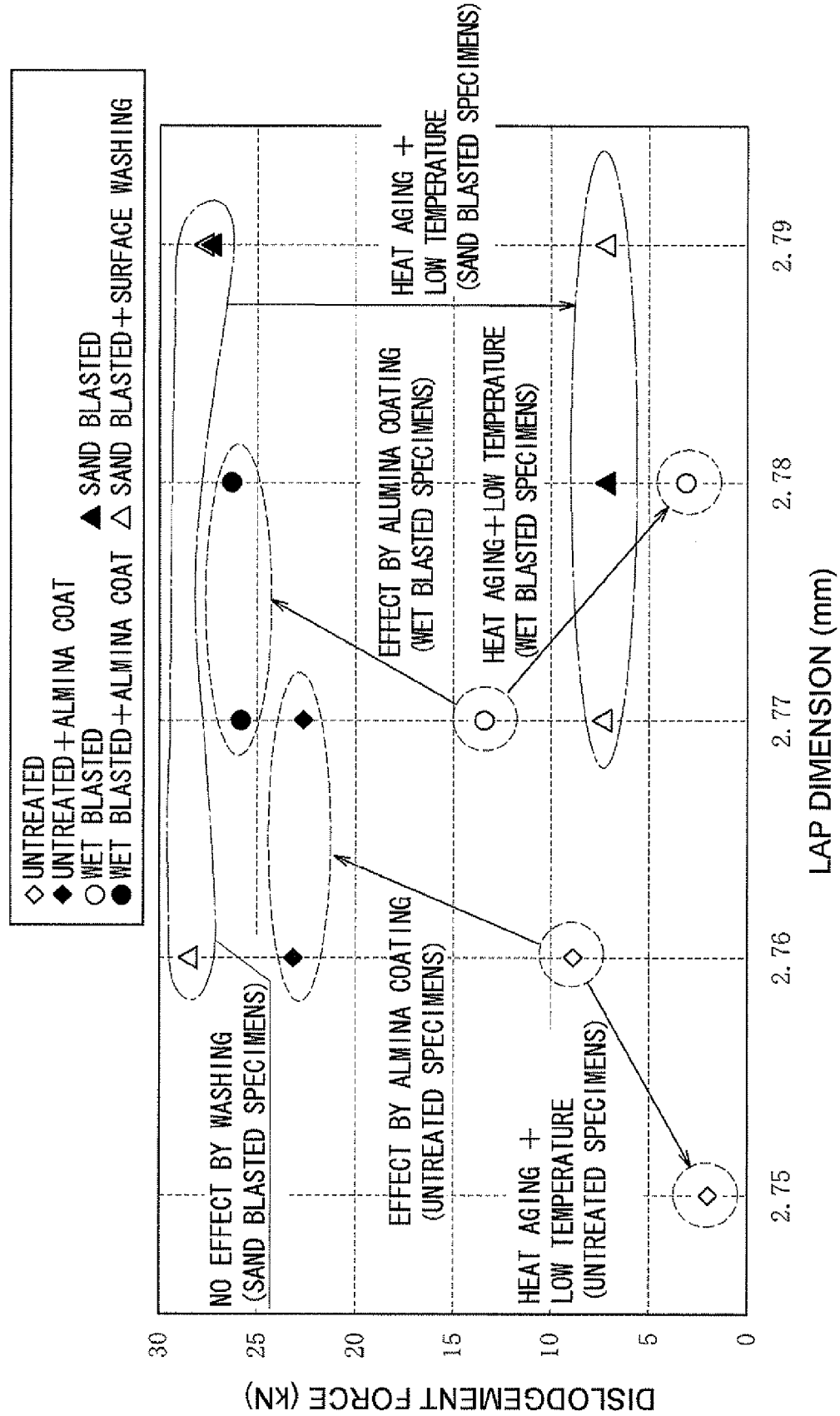
FIG. 9 is a graph showing the relationship of outer cylinder surface treatment and dislodgement force.

The results are presented in Table 7 and FIG. 9.

TABLE 7

Dislodgement force measurements

| | Environmental load profile | | | | | | | | | | | | | |
|---|---|---|---|---|---|---|---|---|---|---|---|---|---|---|
| | None (blank) | | | | | | | | | Heat aging + low temperature | | | | |
| | Untreated | | | Wet blasted | | | Blasting Sandblasted Surface treatment | | | Untreated | Wet blasted | Sandblasted | | |
| | Uncoated | Alumina coat | | Uncoated | Alumina coat | | Unwashed | Washed | | Uncoated | Uncoated | Unwashed | Washed | |
| Outer tube spec. No. | A | G | H | I | J | K | C | L | M | N | O | P | Q | R |
| Product dia. pre-press fit (mm) | 71.59 | 71.58 | 71.59 | 71.59 | 71.59 | 71.60 | 71.60 | 71.59 | 71.60 | 71.58 | 71.60 | 71.60 | 71.59 | 71.61 |
| Jig internal dia. (mm) | 68.83 | 68.82 | 68.82 | 68.82 | 68.81 | 68.83 | 68.81 | 68.83 | 68.81 | 68.83 | 68.82 | 68.82 | 68.82 | 68.82 |
| Lap dimension (mm) | 2.76 | 2.76 | 2.77 | 2.77 | 2.78 | 2.77 | 2.79 | 2.76 | 2.79 | 2.75 | 2.78 | 2.78 | 2.77 | 2.79 |
| Dislodgement force (kN) | 8.90 | 23.20 | 22.70 | 13.50 | 26.30 | 25.90 | 27.30 | 28.50 | 27.70 | 2.10 | 3.15 | 7.20 | 7.40 | 7.10 |
| Product dia. after dislodging (mm) | 70.77 | 70.77 | 70.78 | 70.79 | 70.77 | 70.79 | 70.78 | 70.78 | 70.77 | 69.42 | 69.46 | 69.40 | 69.39 | 69.44 |
| Sinkage (mm) | 0.82 | 0.81 | 0.81 | 0.80 | 0.82 | 0.81 | 0.82 | 0.81 | 0.83 | 2.16 | 2.14 | 2.20 | 2.20 | 2.17 |

A characteristic problem encountered with resin outer cylinders 12 is sinkage (permanent deformation) occurring as a change over time subsequent to press fitting, together with a decline in dislodgement force caused by the associated relaxation of stress. Accordingly, dislodgement force was also measured while conducting heat aging tests (heat aging by holding at 80° for 42 hours) and cold exposure tests (exposure to −40° for 3 hours) as accelerated sinkage tests. Resin outer cylinders 12 experience a high level of cooling-induced shrinkage with respect to the metal mated component, resulting in a loss of dislodgement force; the test involving exposure to −40° was carried out to ascertain the extent to which this occurred.

Of specimens subjected to these conditions of heat aging+ low temperature exposure, measurements were taken for those that did not undergo blasting and those that underwent wet blasting respectively, but that did not undergo alumina coating; while for specimens that underwent sandblasting, measurements were taken for those that did not undergo washing, and those that underwent washing, respectively.

As represented by the results in Table 7 and FIG. 9, for specimens that did not undergo blasting and specimens subjected to wet blasting, respectively, deposition of alumina powder simply through application by being sprinkled on produced a dramatic increase in dislodgement force.

However, where alumina powder is deposited simply through application by being sprinkled on in this way, the alumina powder is not retained securely on the outside peripheral face of the outer cylinder 12, thus posing the risk of shedding from the outside peripheral face of the outer cylinder 12 if brushed with the hand or touched by some other object.

In contrast, specimens for which alumina powder was deposited onto the outside peripheral face of the outer cylinder 12 by sandblasting experienced no drop in dislodgement force even when washed vigorously, and did not shed the alumina powder.

This demonstrates that the alumina powder became embedded and securely retained on the outside peripheral face of the outer cylinder 12, and is not shed from the outside peripheral face due to washing. In Table 7, dislodgement force values subsequent to being subjected to conditions of heat aging+low temperature exposure described above are 7.20 kN, 7.40 kN, and 7.10 kN, which values are sufficient.

Next, in order to specifically ascertain the effect on dislodgement force of forming a resin coating film of epoxy resin on the inside peripheral face of the mated component 38 through cationic electrodeposition coating, after subjecting the resin outer cylinder 12 to blasting treatment, comparative tests of dislodgement force thereof were carried out using the round cylindrical jig 42 depicted in FIG. 5, in one case with a resin coating film formed on the inside peripheral face, and in the other case with no film.

In the tests described previously, the outer cylinder 12 consisted of polyamide 66 containing 33 mass % of glass fibers. In this case however, the outer cylinder 12 consists of polyamide 66 containing 50 mass % of glass fibers. Additionally, while in the previous tests, short fibers (with length of 300 μm in resin pellet form prior to molding the outer cylinder 12) were employed as the glass fibers, here, long fibers (with length of 10 mm in resin pellet form prior to molding the outer cylinder 12) are used.

For this test, a vibration damping rubber bushing 10 whose outer cylinder 12 has undergone blasting treatment is initially press fit into a round circular jig 42 having a resin coating film formed on the inside peripheral face by cationic electrodeposition coating, and is then dislodged; and subsequently a vibration damping rubber bushing 10 different from the dislodged vibration damping rubber bushing 10 and having undergone a blasting treatment is press fit into this same jig 42 then dislodged, while measuring the dislodgement force at this time (specimens designated as jig-reinserted specimens in Table 8).

For this test, blast treatments were carried out using the same projectile material as in the previous tests. Blasting conditions were blasting pressure of 0.57 MPa and nozzle diameter of φ9.2 mm. Cationic electrodeposition coating was carried out using HG350E™ made by Kansai Paint Co., Ltd.

as the coating material. The resin coating films produced at this time had thickness of between 25 and 30 µm. Table 8 shows results for specimens with cationic coating, without cationic coating, and jig-reinserted specimens, giving measurements for three specimens in each case.

TABLE 8

|  | With cationic coating | | | Without cationic coating | | | Jig-reinserted | | |
| --- | --- | --- | --- | --- | --- | --- | --- | --- | --- |
|  | 1 | 2 | 3 | 1 | 2 | 3 | 1 | 2 | 3 |
| Product dia. pre-press fit (mm) | 71.63 | 71.64 | 71.63 | 71.62 | 71.63 | 71.63 | 71.62 | 71.64 | 71.63 |
| Jig internal dia. (mm) | 68.56 | 68.56 | 68.56 | 68.56 | 68.56 | 68.56 | 68.56 | 68.56 | 68.56 |
| Lap dimension (mm) | 3.07 | 3.08 | 3.07 | 3.06 | 3.07 | 3.07 | 3.06 | 3.08 | 3.07 |
| Dislodgement force (kN) | 42.0 | 42.0 | 41.5 | 23.5 | 24.0 | 24.0 | 28.0 | 31.0 | 31.0 |
| Product dia. after dislodging (mm) | 70.60 | 70.64 | 70.65 | 70.61 | 70.63 | 70.62 | 70.63 | 70.64 | 70.64 |
| Sinkage (mm) | 1.03 | 1.00 | 0.98 | 1.01 | 1.00 | 1.01 | 0.99 | 1.00 | 0.99 |

Sample number n = 3

As indicated by the results in Table 8, the specimens without cationic coating have dislodgement force (kN) of 23.5, 24.0, and 24.0, for an average of approximately 24, whereas the specimens with cationic coating have dislodgement force of 42.0, 42.0, and 41.5, for an average of approximately 42. Thus, the specimens with cationic coating have dramatically higher dislodgement force as compared with the specimens without cationic coating (dislodgement force of specimens without cationic coating is approximately 40% lower than that of specimens with cationic coating). From the above, it will be understood that cationic coating of the mated component 38 is extremely effective in increasing dislodgement force.

The jig-reinserted specimens, that is, those for which initial press fitting and removal of a vibration damping rubber bushing 10 is followed by press fitting of another, new vibration damping rubber bushing 10, dislodgement force is 28.0, 31.0, and 31.0 (average of approximately 30), so dislodgement force is approximately 30% lower as compared with specimens with cationic coating.

The lower dislodgement force is thought to result from partial peeling off of the resin film from the inside peripheral face when the initially press fit vibration damping rubber bushing 10 is removed. However, dislodgement force exhibits consistently higher values, as compared with specimens with no cationic coating.

This observation also shows that the resin coating film produced by cationic coating functions effectively in increasing dislodgement force.

The results in Table 8 show that dislodgement force for specimens with cationic coating as high as an average of 42 kN. This value is one close to double the dislodgement force values of 28.5 and 27.3 (for blasting treatment specimens) in Table 7 for example. This difference in dislodgement force is an effect of using long fibers at a high level of 50 mass % as the glass fibers contained in the resin used in the tests whose results are given in Table 8.

The results in FIG. 8 show that even in instances where cationic electrodeposition coating is not carried out, dislodgement force is increased by subjecting the outside peripheral face of the resin outer cylinder 12 to blasting treatment to deposit rigid powder thereon. As shown by the preceding tests, where the jig 42 subjected to cationic electrodeposition coating on its inside peripheral face is used, if the resin outer cylinder 12 has not undergone blasting treatment, the dislodgement force is as low as approximately one-third the value for specimens that have undergone blasting treatment.

Meanwhile, the results in FIG. 8 also show that, for specimens whose outer cylinder 12 has undergone blasting treatment, even if the jig 42 has not undergone cationic electrodeposition coating, the decline in dislodgement force compared to the case where cationic electrodeposition coating has been carried out does not exceed a decrease of approximately 40%.

Regardless of whether the jig 42 has undergone cationic electrodeposition coating or not, its inside peripheral face is smooth and flat and the physical properties of the inside peripheral face are substantially identical, so where the outer cylinder 12 has not undergone blasting treatment, dislodgement force is substantially equal between the two. The fact that, in instances where the jig 42 has not undergone cationic electrodeposition coating, the extent of decline in dislodgement force as compared to the case where cationic electrodeposition coating has been carried out does not exceed about 40% is an effect of rigid powder having been deposited on the outside peripheral face of the resin outer cylinder 12 through blasting treatment (the difference between the decline to one-third and the decline by 40% is due to the presence or absence of the action of the rigid powder), which means that even if the mated component 38 does not undergo cationic electrodeposition coating, dislodgement force nevertheless increases through deposition of rigid powder on the outer cylinder 12 through blasting treatment.

Similarly, between a mated component 38 (or in this instance the inside peripheral face of the jig 42) that has undergone cationic electrodeposition coating versus one that has not, the physical properties are thought to be substantially identical, leading one to expect that if the outside peripheral face of the resin outer cylinder 12 were simply subjected to surface roughening, the dislodgement force would be about the same regardless of whether the jig 42 underwent cationic electrodeposition coating or not. In actual practice however, the results in Table 8 indicate large differences in dislodgement force where cationic electrodeposition coating has been carried out versus where it has not. This is due to the effect of depositing rigid powder on the outside peripheral face of the outer cylinder 12 by blasting treatment, in other words, evidence that the presence of the rigid powder contributes appreciably to improved dislodgement force.

During molding of the outer cylinder 12 the long glass fibers contained in the resin become segmented and shorter in length, and assume various lengths as a result of this segmentation. However, when one considers that the use of long fibers imparts high rigidity to the outer cylinder 12, and that dramatically higher dislodgement force is due to the fact that the glass fibers contained in the resin outer cylinder are long fibers, it is apparent that even in the product molding state, the majority of the glass fibers contained in the outer cylinder 12 will as a matter of course remain in the form of long fibers above a certain length. For example, where glass fibers 1 mm or greater in length are contained in the molded article, the article may be distinguished as one incorporating long fibers that are longer than conventional 300 μm reinforcing materials.

As demonstrated by the examination discussed above, according to the present embodiment, dislodgement force of the vibration damping rubber bushing 10 subsequent to assembly by press fitting into the mated component 38 may be dramatically increased in comparison with the prior art.

The preceding detailed description of a preferred embodiment of the present invention is merely exemplary.

For example, various other rigid powders besides alumina may be used in the present invention, or various other methods that may be used as the method for depositing the powder onto the outside peripheral face of the outer cylinder 12. The present invention may be embodied incorporating these or various other modifications without departing from the scope and spirit thereof.

KEY TO SYMBOLS

10: vibration damping rubber bushing
12: outer cylinder
14: inner cylinder
16: rubber elastic body
36: bushing assembly
38: mated component

The invention claimed is:

1. A method of manufacturing a bushing assembly that includes a vibration damping rubber bushing having a round cylindrical resin outer cylinder, a rigid inner cylinder, and a rubber elastic body integrally vulcanization bonded to the outer cylinder and the inner cylinder, and providing elastic linkage thereof, the bushing assembly being assembled by press fitting an outside peripheral face of the outer cylinder in an axial direction into a cylindrical metal mated component having a circular inside peripheral face, the method comprising the steps of:

press fitting the vibration damping rubber bushing into the mated component with the outside peripheral face of the outer cylinder: wherein
the outside peripheral face of the outer cylinder is subjected to blasting treatment with a rigid powder, which is employed as projectile material and is composed of material harder than the outer cylinder, the rigid powder being deposited in an embedded condition and retained in a section of the resin outer cylinder that is situated on the outside peripheral face and that mates with the inside peripheral face of the mated component; and assembling the outer cylinder and the mated component in a mated condition such that the rigid powder intervenes between the outside peripheral face of the outer cylinder and the inside peripheral face of the mated component, wherein
a resin coating of epoxy resin is formed on the inside peripheral face of the mated component by cationic electrodeposition coating, coating, wherein the resin coating of epoxy resin is a film having a thickness of between about 10-30 μm; and
the rigid powder deposited in the embedded condition and retained in the section of the resin outer cylinder is embedded into the resin coating of epoxy resin formed on the inside peripheral face of the mated component in order to increase a dislodgement force of the vibration damping rubber bushing.

2. The method of manufacturing a bushing assembly according to claim 1, wherein the rigid powder comprises a ceramic powder.

3. The method of manufacturing a bushing assembly according to claim 2, wherein the rigid powder comprises alumina powder.

4. The method of manufacturing a bushing assembly according to claim 1, wherein the rigid powder is a ceramic powder and has an angular shape as a result of blasting.

5. A vibration damping rubber bushing comprising:

a round cylindrical resin outer cylinder;

a rigid inner cylinder; and a rubber elastic body integrally vulcanization bonded to the outer cylinder and the inner cylinder and providing elastic linkage thereof, and being adapted to be assembled with an outside peripheral face of the outer cylinder press fit in an axial direction into a cylindrical metal mated component having a circular inside peripheral face; wherein a rigid powder composed of material harder than the outer cylinder is deposited in a section of the resin outer cylinder that is situated on the outside peripheral face and that mates with the mated component;

the rigid powder is deposited in an embedded condition on the outside peripheral face of the outer cylinder through blasting treatment of the outside peripheral face employing the rigid powder as projectile material; and a resin coating of epoxy resin is formed on the inside peripheral face of the mated component by cationic electrodeposition coating, wherein the resin coating of epoxy resin is a film having a thickness of between about 10-30 μm; and the rigid powder deposited in the embedded condition and retained in the section of the resin cylinder is embedded into the resin coating of epoxy resin formed on the inside peripheral face of the mated component in order to increase a dislodgement force of the vibration damping rubber bushing.

6. The vibration damping rubber bushing according to claim 5, wherein the rigid powder comprises a ceramic powder.

7. The vibration damping rubber bushing according to claim 6, wherein the rigid powder comprises alumina powder.

8. The vibration damping rubber bushing according to claim 5, wherein the rigid powder is a ceramic powder and has an angular shape as a result of blasting.

* * * * *